United States Patent [19]

Brown, Jr.

[11] 3,984,449

[45] *Oct. 5, 1976

[54] HYDROCARBONOXY-CONTAINING SILICONE FLUIDS USEFUL AS HYDRAULIC FLUIDS

[75] Inventor: Edgar D. Brown, Jr., Schenectady, N.Y.

[73] Assignee: General Electric Company, Waterford, N.Y.

[ * ] Notice: The portion of the term of this patent subsequent to Sept. 3, 1991, has been disclaimed.

[22] Filed: Dec. 28, 1973

[21] Appl. No.: 429,386

Related U.S. Application Data

[62] Division of Ser. No. 256,483, May 24, 1972, Pat. No. 3,821,114.

[52] U.S. Cl. .............................. 252/78; 260/448.8 R
[51] Int. Cl.² .......................................... C09L 3/00
[58] Field of Search .......................... 252/78, 49.6; 260/448.8 R, 448.2 E

[56] References Cited
UNITED STATES PATENTS

| | | | |
|---|---|---|---|
| 2,389,805 | 11/1945 | McGregor | 260/448.2 S |
| 2,398,187 | 4/1946 | McGregor | 252/78 |
| 2,559,342 | 7/1951 | Burkhard | 260/46.5 R |
| 2,624,749 | 1/1953 | Bunnell | 260/448.8 R |
| 2,746,926 | 5/1956 | Barry | 252/78 |
| 2,995,590 | 8/1961 | Peeler | 252/78 |
| 2,995,592 | 8/1961 | Peeler | 252/78 |
| 3,425,750 | 2/1969 | Deane | 303/6 |
| 3,600,418 | 8/1971 | Bailey | 260/448.8 R |
| 3,629,310 | 12/1971 | Bailey | 260/448.8 R |
| 3,833,505 | 9/1974 | Brown, Jr. | 252/78 |

Primary Examiner—George F. Lesmes
Assistant Examiner—Ellis P. Robinson
Attorney, Agent, or Firm—Donald J. Voss; E. Philip Koltos; Frank L. Neuhauser

[57] ABSTRACT

A silicone polymer fluid useful as a brake fluid comprising a polymer or monomer having 0 to 100 mole percent of polymeric or monomeric units selected from $P_2Si(OM)_2$ units,

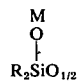

units and $R_2SiO$ units. 0 to 100 mole percent of polymeric and monomeric units selected from $RSi(OM)_3$ units.
units.

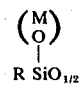

units,

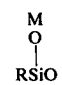

units, and $RSiO_{3/2}$ units. 0 to 10 mole percent of units selected from the class consisting of $(MO)_3SiO_{1/2}$ units. $(MO)_2SiO$ units. $(MO)SiO_{3/2}$ units and $SiO_2$ units and 0 to 5 mole percent of units selected from $R_3SiO_{1/2}$ units wherein the viscosity of the polymer may vary from 2 to 400 centistones at 25°C. R is a monovalent hydrocarbon radical, M is selected from alkyl, alkoxy, alkylene, alkoxyalkyleneoxyalkylene and alkyl polyether substituent radicals, wherein the preferred substituent for M is 2-methoxy-2-ethoxyethylene or higher and R is preferably methyl.

4 Claims, No Drawings

HYDROCARBONOXY-CONTAINING SILICONE FLUIDS USEFUL AS HYDRAULIC FLUIDS

This application is a division of copending application Ser. No. 256,483, now U.S. Pat. No. 3,821,114, filed May 24, 1972.

BACKGROUND OF THE INVENTION

The present invention relates to silicone polymer fluids that are useful as hydraulic fluids and more particularly the present invention relates to silicone polymer fluids where a substantial portion of the substituent groups on the silicon atoms are alkoxy groups and various other types of alcoholic substituent groups which groups are attached to the silicon atoms.

Most brake fluids that are presently sold are basically glycol based polyethers which vary from case to case depending on the type of polyether units and the number of polyether units in the polymer chain. Although such brake fluids have found wide acceptance and usage in vehicles and particularly automobiles, such glycol base fluids have various disadvantages so that various automobile manufacturers have sought to obtain a better quality of brake fluid so that such brake fluid when inserted into the brake system of an automobile would provide a higher factor of safety.

One of the disadvantages of such glycol based polyether brake fluids is that it has a rather limited high temperature stability. Thus, it has been found that at some temperatures to which the brake system of an automobile may conceivably be exposed to, the brake fluids presently on the market might degrade or evaporate. It has also been found that at such high temperatures which the brake system of an automobile might be exposed to that the brake fluids presently on the market might possibly vaporize, causing spontaneous brake failure. Thus, the brake fluids presently on the market tend to have an undesirable low boiling point.

Another disadvantage of the glycol based polyether brake fluids presently on the market is that they are hygroscopic, that is, such fluids tend to pick up water and moisture from the air quite easily. Although such glycol based polyether brake fluids have the property of being compatible with large amounts of water, nevertheless, due to their hygroscopicity they will over a period of time absorb a large amount of moisture into the system, such that when the compatibility level of the water in the polyether glycol based fluid is exceeded the water will cause undesirable changes in the physical properties of the brake fluid. At low temperatures such large amounts of absorbed water in the polyether glycol based brake fluid will undesirably increase the viscosity of the brake fluid and deleteriously affect the performance of the brakes. At high temperatures the presence of large amounts of water may result in the water being vaporized to create what is known as vapor-lock in the hydraulic lines of the brake system, which also results in improper performance of the brakes.

To meet these disadvantages of the brake fluids presently on the market, manufacturers have looked at other types of fluids that would have a higher performance factor in automobile brake systems and particularly have looked on brake fluids that would not have the disadvantages of the glycol based polyether brake fluids which are mentioned above.

Several silicone fluids have been proposed for use as brake fluids. Silicone fluids have the particular advantage of a very high flash point and do not degrade and thus retain their chemical stability at high temperatures. In addition, silicone fluids have a high fire point such that even during periods of exceptional stress in the operation of the brake hydraulic system of an automobile the temperature that is reached in the hydraulic system is considerably below the flash point and fire point of such silicone fluids. In addition, silicone fluids have the additional advantage that they have a desirably low viscosity at low temperatures even at temperatures as low as −40°C. In addition, most silicone fluids are not hygroscopic such that they take up very little water or moisture from the air and thus are not usually bothered with the problems of excessive water pick-up. However, it has been envisioned that water by some means or other may by accident enter into the hydraulic system so that it is desirable that a silicone fluid be compatible with a reasonable amount of water, that is, the water can be absorbed into the silicone fluid. In addition, it is desirable to obtain a silicone fluid which has as low viscosity as possible at a low temperature, say, of −40°C and yet have a minimum viscosity at high operable temperatures.

The necessity for such a desirably low viscosity of the brake fluid at low temperatures, say, as −40°C is so that such a fluid can be used in very cold climates and even in artic regions. It should be pointed out that in artic areas because of the large amount of precipitation and particularly snow, it is desirable that the silicone brake fluid be compatible with a certain amount of water, say, up to 6% by weight of water.

In addition, it is desired that the silicone fluid that is to be used as a brake fluid be compatible with the common brake fluids presently on the market, that is, the non-silicone brake fluids, the glycol based polyether fluids. Thus, if by accident some non-silicone brake fluid enters the system or if silicone fluid is added by accident to a hydraulic braking system to replace some glycol based polyether fluid, then it is desirable that the silicone fluid be compatible with the glycol based polyether fluid.

While the above discussion has been directed to the use of a silicone polymer as a brake fluid, it should be mentioned that the above desired properties for a silicone fluid, that is, a silicone fluid having the above-named advantages over glycol based polyether fluids, would be a superior hydraulic fluid for use in hydraulic systems. Thus, such a hydraulic system may or may not include a hydraulic reservoir; it would include a mechanical hydraulic activating means which may for instance be a brake pedal to which mechanical pressure is applied; and it would also include a hydraulic activated means which may be the pistons or other types of mechanisms that are activated by the hydraulic pressure in the brake drum shoe or disc brake or other type of hydraulic system assembly. The hydraulic activating means, hydraulic activated means and hydraulic reservoir are all connected by the necessary hydraulic lines. Thus, it is not intended to limit the application of the novel silicone polymer fluid disclosed in this application solely for use in brake hydraulic systems but such a fluid may be used in all types of known hydraulic systems which fluid would have the superior advantages and properties of silicone fluids as well as the specific advantages mentioned above.

Accordingly, it is one object of the present invention to provide for novel silicone polymer fluid having a viscosity that may vary from 2 to 400 centistokes and having a substantial amount of hydrocarbonoxy substituents and hydrocarbonoxy-type substituents on the silicon atoms.

It is another object of the present invention to provide for a novel process for producing a silicone polymer fluid having a viscosity from 2 to 400 centistokes and having a substantial amount of hydrocarbonoxy and hydrocarbonoxy-type substituents of the silicon atom.

It is yet an additonal object of the present invention to provide a novel silicone polymer fluid useful as a hydraulic fluid and particularly useful as a hydraulic brake fluid.

It is an additional object of the present invention to provide for a novel silicone polymer fluid having a viscosity of 2 to 400 centistokes at 25°C and which has a compatibility of up to 100% by weight of the fluid of water.

It is still an additional object of the present invention to provide a novel silicone polymer fluid which may be used as a hydraulic fluid and is generally compatible with brake fluids presently sold in commerce.

These and other objects of the present invention are accomplished by means of the invention defined below.

SUMMARY OF THE INVENTION

In accordance with the present invention, there is provided a novel silicone polymer fluid useful as a brake fluid comprising a polymer having 0 to 100 mole percent of monomeric units and polymeric units selected from $R_2Si(MO)_2$ units,

units and $R_2SiO$ units and mixtures thereof, 0 to 100 mole percent of units selected from monomeric units and polymeric units, $RSi(OM)_3$ units,

units,

units, and $RSiO_{3/2}$ units and mixtures thereof, 0 to 10 mole percent of polymeric units selected from $(MO)_3SiO_{1/2}$ units, $(MO)_2SiO$ units, $MO\ SiO_{3/2}$ units and $SiO_2$ units and mixtures thereof, and 0 to 5 percent of polymeric units selected from $R_3SiO_{1/2}$ units, wherein any class all of the different units may be present in any combination or mixture and wherein all or some of the units in each class may be present and are normally presented in all type of combinations with the units of the other classes within the mole percent limits set forth above; where the molar amount of MO groups present based on the total of moles of R and MO groups present together may vary from 0 to 95 mole percent and in which the viscosity of the polymer may vary from 2 to 400 centistokes at 25°C, R is selected from the class consisting of monovalent hydrocarbon radicals, halogenated monovalent hydrocarbon radicals and cyanoalkyl radicals, M is selected from the class consisting of R—, ROR'—, ROR'OR'—, $R(OC_xH_{2x})_n$—, and

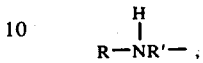

such that R is as previously defined and the various R radicals attached to the silicon atoms may be the same or all different and the various R radicals present in the M groups may be the same as the R radicals attached to the silicon atoms or different; where the R' radical is selected from the class consisting of divalent hydrocarbon radicals and halogenated divalent hydrocarbon radicals and where the various R' radicals may be the same or different and wherein R' preferably represents a divalent saturated aliphatic radical of 2 to 10 carbon atoms; x in the polyether group defined above varies from 2 to 4 and n is at least 4 and may be as high as 100. The preferred radical for M is 2-methoxy-2-ethoxy ethylene and higher and the R group attached to the silicon is preferably methyl. In most cases, the hydrocarbonoxy fluid is a polymer. However, it can also be a monomer, a mixture of monomers or a mixture of monomers with polymers within the scope of the above formula. The monomers that may be present are, of course, $R_2Si(OM)_2$ and $RSi(OM)_3$.

When the above novel silicone fluid is used as a silicone brake fluid in automobiles to obtain the optimum compatibility between this novel silicone fluid and the non-silicone fluids presently sold in commerce, it is preferred that the fluid polymer of the present invention have 20% by weight to 48% by weight of MO groups based on the total weight of the fluid.

More preferably, the novel silicone hydraulic fluid of the present invention which may be used as a brake fluid contains 75 to 95 mole percent of polymeric units selected from

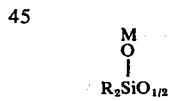

units and $R_2SiO$ units in combination with 5 to 25 mole percent of units selected from the class consisting of

units,

units, and $RSiO_{3/2}$ units with trace amounts of the other units. Thus, in the preferred embodiment of the novel silicone fluid of the present invention there is preferably only trace amounts of $(MO)_3SiO_{1/2}$ units, $(MO)_2SiO$ units, $MO\ SiO_{3/2}$ units and $SiO_2$ units and there is preferably only trace amounts of $R_3SiO_{1/2}$ units. It is found that a brake fluid with only the preferred units discussed above has the more preferred properties and in addition is produced more economically. However, the other types of units mentioned previously may also be present in the silicone polymer fluid of the present invention in the amounts indicated previously depending on the type of starting materials that are used and the amounts of the starting materials that are used to prepare the novel silicone polymers of the present case.

The above silicone fluid mixture, irrespective of its form, has been found to be especially suitable for use as a brake fluid. However, it is not intended to limit the application in the present specification of the silicone fluid mixture defined above to use just in the hydraulic system of an automobile or other type of vehicle. More broadly, the silicone fluid mixture of the present invention is directed to a suitable use as a hydraulic fluid in any hydraulic system. In the more specific preferred embodiment of the present invention the silicone fluid mixture defined above, with or without the various additives, is particularly suitable for use in the hydraulic brake system of an automobile, truck or other such type of vehicle. Such an automotive vehicle will contain as part of its brake system a hydraulic reservoir, a brake drum cylinder with the necessary pistons therein or the comparable equipment to be found in a disc brake system and in addition, the necessary pistons and connecting links by which the operator of the vehicle applies mechanical pressure which is transferred into hydraulic pressure. The reservoir, brake drum, cylinder, pistons, as well as the equivalent disc brake appendages and the mechanical force applying equipment are all connected by the necessary hydraulic lines and other types of supplementary equipment.

To generally describe such a hydraulic brake system, in all types of vehicles irrespective of the type of vehicle, reference will simply be made to a hydraulic reservoir; to the hydraulic activating means which is the mechanical means by which an operator of a vehicle translates his physical pressure, that is, the brake pedal and the piston which it activates; to hydraulic activated means which will refer to the brake drum cylinder and the pistons therein or the equivalent disc brake system; and to hydraulic lines, that is, the hydraulic lines, connecting all of these parts of the hydraulic brake system together. Since the purpose of the present application is not to define or describe a novel type of brake system or a novel type of hydraulic system per se, the different types of brake systems and hydraulic systems will not be described herein in detail since the direction of the present application is to describe a novel hydraulic fluid and, more preferably, a novel hydraulic fluid as used in a hydraulic brake system.

DESCRIPTION OF THE PREFERRED EMBODIMENT

The radical R appearing in the above formulas is well known in the art; is typlified by the radicals usually associated with silicon bonded organic groups in the case of R; and generally associated with divalent hydrocarbon radicals in the case of R'. The organic radicals represented by R include monovalent hydrocarbon radicals, halogenated monovalent hydrocarbon radicals and cyanoalkyl radicals. Thus, the radical R may be alkyl, such as methyl, ethyl, propyl, butyl, octyl; aryl radicals, such as phenyl, tolyl, xylyl, naphthyl radicals; aralkyl radicals, such as, benxyl, phenylethyl radicals; olefinically unsaturated monovalent hydrocarbon radicals, such as vinyl, allyl, cyclohexyl radicals; cycloalkyl radicals, such as cyclohexyl, cycloheptyl, etc.; halogenated monovalent hydrocarbon radicals, such as chloromethyl, dichloropropyl, 1,1-trifluoropropyl, chlorophenyl, dibromophenyl and other such radicals; cyanoalkyl radicals, such as cyanoethyl, cyanopropyl, etc. The various R radicals attached to the silicon atom may be the same of different. Thus, all the R radicals attached to the silicon atom may be lower alkyl, that is, lower alkyl radicals, having 1 to 8 carbon atoms or a mixture of various types of lower alkyl radicals or a mixture of lower alkyl radicals with the other types of radicals defined above for the R group. Preferably, the R radicals attached to the silicon atoms are selected from lower alkyl radicals having 1 to 8 carbon atoms and more preferably, methyl. The R radicals in the M groups may be the same as the R radicals attached to the silicon atoms or may be different. Preferably, the R radicals in the M groups are lower alkyl radicals of 1 to 8 carbon atoms such as, methyl.

The radicals represented by R' may be any alkylene or arylene radicals of up to 20 carbon atoms and more preferably of 1 to 10 carbon atoms such as, mathylene, ethylene, various isomers of the phenylene radicals of substituted propylene, phenylene radicals. In the preferred embodiment, R' is ethylene.

It should be noted that in a particular M group as defined above, if there are more than one R' radical the R' radical may be the same or may be different.

In the case where the M is a polyether group, the R radical is preferably butyl, an alkyl radical of 1 to 4 carbon atoms and more preferably methyl. In addition, x is preferably 2 or 3 and n varies from 4 to 100.

In the process for producing the silicone polymer fluids of the present invention, there is preferably hydrolyzed a mixture of organohalosilanes. Thus, there is preferably used a mixture of organohalosilanes in which mixture there is present 0 to 100 mole percent of organohalosilanes of the formula $R_2SiX_2$, 0 to 100 mole percent of organohalosilanes of the formula $R SiX_3$, 0 to 10 mole percent of organohalosilanes of the formula $SiX_4$, and 0 to 5 mole percent of organohalosilanes of the formula $R_3SiX$ where in the above formulas R is as previously defined, and X represents halogen, most preferably, chlorine. To this general mixture of organohalosilanes there is generally added 0 to 3.5 moles of water per mole of the mixture.

In the preferred reactant mixture of organohalosilanes there is preferably present 75 to 95 mole percent of $R_2SiX_2$ organohalosilanes and 5 to 95 mole percent of $R SiX_3$ organohalosilanes. In the most preferred reactant mixture of the present invention, there is utilized 85 weight percent based on the total weight of the organohalosilane reactant mixture of silanes of the formula $R_2SiX_2$ and 15 weight percent based on the weight of the total reactant silane mixture of silanes of the formula $R SiX_3$. Thus, in this preferred mixture of organohalosilanes there is preferably absent any substantial amount of silanes of the formula $SiX_4$ and $R_3SiX$. In the most preferred embodiment of the present invention, a sufficient amount of water is added to the silanes so as to hydrolyze 25 mole percent of the chlorine atoms present on the organohalosilanes. More generally, there is preferably added sufficient water to hydrolyze 0 to 95 mole percent of the chlorine atoms present on the organohalosilanes and more preferably 50 to 85 mole percent. In the case where the general reactant mixture is used, there is preferably added 0 to 3.5 moles of water per mole of the organohalosilane mixture. The water is added slowly to the silanes with agitation so as to obtain uniform mixing of the water in the silanes and to obtain proper hydrolysis of the silanes. Although the reaction is exothermic, the evaporation and evolution of hydrogen chloride that is formed will normally reduce the temperature of the reaction in the range of 0 to 20° C and more preferably 0° to 10° C. It is preferred to maintain the temperature of reaction during the addition of the water to the organohalosilanes below 20° C and more preferably below 10° C to prevent the organohalosilanes from being evaporated off from the reaction mixture.

The resulting hydrolyzate is a silicone polymer fluid with a certain number of chlorine atom substituents on the silicon atoms depending on the amount of water that is added during the hydrolysis. A solution of this hydrolyzate is obtained by adding to the hydrolyzate one of the well known water-immiscible organic solvents which is inert to the chlorine atoms in the hydrolyzate. Such a water-immiscible organic solvent may be for instance, tolyene, xylene, benzene, octane, heptane, cyclohexane and etc. The resulting solution is then heated to a temperature in the area of 25° to 100° C and more preferably 25° — 50° C, at which point the hydrolysis is substantially completed, and the hydrolyzate is in solution in the organic solvent.

At this point the chlorine atoms in the hydrolyzate may be substituted by condensing the hydrolyzate with an alcohol. Examples of alcohols that may be used are ROH, ROR'OH, ROR'OR'OH, R(OC$_x$H$_{2x}$)$_n$OH and R-N-R'OH where R and R' is as previously defined. The most preferred alcohol that may be used is 2-methoxy-2-ethoxy ethanol or higher. It has been found that this alcohol results in a brake fluid which is very compatible with presently available glycol based polyether brake fluids. The polyether substituent group and the amine substituent group may also be used to provide silicone hydraulic fluid of the present invention which is highly compatible with glycol based polyether brake fluids. In addition, the amine substituent group is desirable in the silicone polymer in that not only is the resulting silicone polymer more desirably compatible with glycol based polyether fluids presently on the market, but further and in addition, the presence of the amine group buffers the silicone fluid and results in the silicone fluid being slightly basic which is desirable in a hydraulic fluid.

Preferably, there can be used the stoichiometric amount of the alcohol necessary to react with the chlorine atoms. Preferably, to have complete condensation of the alcohol groups or substitution of the alcohol groups for the chlorine atoms, it is desired to use at least 10 weight percent excess of the alcohol reactants disclosed above.

The alcohol is simply added to the solution of the silicone polymer fluid and the water-immiscible organic solvent with the necessary amount of agitation. Preferably, this reaction is carried out at a temperature in the range of 25° to 100° C and more preferably in the temperature range of 25° to 50° C so that the hydrogen chloride that is formed may easily be evolved from the reaction mixture. This reaction takes place anywhere from 30 minutes to 4 hours. It should be noted that the hydrolysis portion of the reaction usually takes place in 1 hour to 4 hours depending on the amount of water that is added to the organohalosilanes or the halosilanes. After the alcohol has been added in the time period mentioned above and the reaction of condensation allowed to proceed in a temperature of 25° to 50° C, the reaction mixture is heated to the reflux temperature of the water-immiscible organic solvent which may be anywhere from 100° to 180° C, and then all the solvent from the polymer product as well as any excess alcohol and any remaining hydrogen chloride is stripped off under vacuum. In addition to stripping off the water-immiscible organic solvent, the excess alcohol and any remaining hydrogen chloride, it is also necessary to strip off any cyclic siloxanes that have been formed in the process since such cyclic siloxanes are undesirable in the silicone hydraulic fluid since their presence tends to decrease the compatibility of the fluid with other hydraulic fluids. This stripping procedure usually takes place from 1 to 4 hours. In addition, the silicone polymer fluid may be heated to 185° C for a period of 5 to 10 minutes to remove off some of the disiloxanes that may have been formed because too large a quantity of such disiloxanes is undesirable in the silicone polymer fluid of the present invention, particularly when the silicone polymer fluid is to be used as a brake fluid. The presence of such disiloxanes in the silicone polymer fluid of the present invention undesirably affects the boiling point of the fluid and results in volatiles being given off at high temperatures. However, all the disiloxanes that are formed in accordance with the process of the present invention may be allowed to remain in the silicone fluid of the present invention without detracting to a large extent from the advantages of the silicone polymer fluid of the present invention as a brake fluid. The resulting silicone polymer fluid when cooled to room temperature has a viscosity of 2 to 400 centistokes at 25° C and more preferably 7 to 20 centistokes at 25° C. Such a silicone fluid is a mixture of polymers having 2 to 2000 silicon atoms in the polymer with the average polymer having 20 to 40 silicon atoms.

In the most preferred embodiment of the above process there is used 85 weight percent of organohalosilanes of the formula $R_2SiX_2$ and 15 weight percent based on the total weight of the organohalosilanes of organohalosilanes of the formula $RSiX_3$. To this mixture which contains only these types of organohalosilanes there is sufficiently added sufficient water to hydrolyze 25 mole percent of the chlorine atoms present. The other chlorine atoms on the silicones are substituted by the alcohol moieties. If this most preferred hydrolysis procedure is carried out then there will be obtained a silicone polymer fluid containing 20 to 48 weight percent of the MO or the hydrocarbonoxy-type of groups based on the total weight of fluid. Such a silicone polymer fluid is extremely compatible with most silicone fluids useful as brake fluids and most non-silicone brake fluids and other types of hydraulic fluids.

In the more general embodiment of the present invention, there is added sufficient water in the hydrolysis procedure so that there may be present in the final silicone fluid polymer 5 mole percent to 100 mole percent of hydrocarbonoxy type of groups, that is, MO groups, based on the total molar amount of substituent groups present in the silicone polymer.

It is, of course, obvious to the skilled worker in the art that the critical phase of producing the novel silicone polymer fluid of the present invention is the amount of water that is used based on the amount of the organohalosilanes so that only the desired amount of siloxane bonds are formed. The chlorine atoms that remain on the hydrolyzed silicone polymer will, of course, be substituted by the alcohol moieties when the alcohol is added to the halogen containing silicone polymer. Thus, the amount of water that is used in the hydrolysis not only controls the molecular weight of the final polymer and thus its viscosity but further, in addition, controls the amount of hydrocarbonoxy groups that will be present on the silicone fluid polymer.

In the preferred case where there is only present in the organohalosilane mixture that is to be hydrolyzed $R_2SiX_2$ silanes and $RSiX_3$ silanes, then it is preferred to use 0 to .93 moles of water per mole of $R_2SiX_2$ present in the organohalosilane mixture and 0 to 1.4 moles of water per mole of $RSiX_3$ in the organohalosilane mixture. In the most preferred embodiment there is used 85 weight percent of the formula $R_2SiX_2$ and 15 weight percent of the organohalosilane of the formula $RSiX_3$, where X stands for chlorine and there is added to this mixture 0.8 moles of water per mole of the mixture so as to hydrolyze and form siloxane bonds of 75 mole percent of the chlorine atoms on the silanes. The rest of the chlorine atoms are substituted by the hydrocarbonoxy-type of moieties. To produce the desired novel silicone polymer fluid of the present case, it is necessary to use the specific amounts of water in the hydrolysis procedure as indicated above and such amounts of water are critical to producing the silicone fluid polymers of the present case. It can be appreciated if too little water is added that the polymers that are formed will be of very low molecular weight that is mostly disiloxanes which disiloxanes would not be as desirable in the fluid of the present invention for use as a hydraulic fluid.

The brake fluid of the present invention may also be made by an alternative process which is not as economically advantageous as the process defined above. This alternative process comprising reacting an alcohol selected from the class consisting of ROH, ROR'OH, ROR'OR'OH, $RCOC_xH_{2x})_nOH$ and

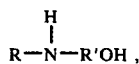

where R, R' and x and n are as previously defined with a hydrogen organopolysiloxane of the formula

         (1)

In the presence of a platinum catalyst, where R has the meaning defined previously, a varies from 0.1 to 2.5, b varies from 0.1 to 2.5 and the sum of a + b varies from 2.01 to 3.00. The hydrogen polysiloxane is added to a reaction chamber and then there is added a sufficient amount of toluene to the hydrogen polysiloxane or any other water-immiscible organic solvent so as to dissolve the hydrogen polysiloxane. The resulting mixture is heated to a temperature in the range of 100° to 150° C to remove any free water by toluene-water azeotrope. Once the solution of hydrogen polysiloxane in the toluene is dried in accordance with the azeotrope technique a trace of platinum catalyst is added to the mixture. At this point, the alcohol in the proper amount, that is, 1 mole of alcohol for each hydrogen atom in the hydrogen polysiloxane, is added to the reaction pot slowly with agitation, preferably 10 mole percent excess of the alcohol may be used. The addition is exothermic so that the temperature is controlled by the alcohol addition rate and is usually maintained in the range of 25° to 75° C. During the reaction, the SiH peak disappearance is followed by an infrared scan. Once the addition of the alcohol to the hydrogen polysiloxane is completed the solution is filtered through Fuller's earth to remove any precipitates. Then the solution is stripped to remove solvents and low boiling fractions to yield the desired polysiloxane which is within the scope of the general definition of the silicone fluid polymer of the present invention and can be thus used as a hydraulic fluid.

It should be noted that the hydraulic fluid prepared in accordance with this alternative method does not contain any of the units that are derived by the use of the silane $SiX_4$ in the prior hydrolysis procedure.

The other types of units that are present in the novel silicone polymer fluid prepared in accordance with this alternative method are strictly within the defined limits of the average unit formula (1) above, which average unit formula defines polymeric silicone fluids within the broad generic definition of the novel silicone polymeric fluids set forth previously.

Suitable catalysts for addition of the organohydrogenpolysiloxane to the alcohol are the various platinum and platinum compound catalysts known in the art. These catalysts include elemental platinum in a finely divided state which can be deposited on charcoal or alumina, as well as various platinum compounds such as chloroplatinic acid, the platinum hydrocarbon complexes of the type shown in U.S. Pat. Nos. 3,159,601 and 3,159,662, as well as the platinum alcoholic complexes prepared from chloroplatinic acid which are described and claimed in Lamoreaux's U.S. patent 3,220,972. Preferably, the platinum catalyst is added to the organohydrogenpolysiloxane located in the reaction chamber to which is also added a solvent and then the alcohol is slowly added to the reaction mixture at the reaction temperatures described above. Whether elemental platinum or one of the platinum complex catalysts is used, the catalyst is generally used in amounts sufficient to provide about $10^{-4}$ to $10^{-6}$ moles of platinum per mole of the alcohol reactant. As mentioned previously, the reaction is effected by adding organohydrogenpolysiloxane to an inert solvent such inert solvent being selected from the group consisting of benzene, toluene, xylene, mineral spirits and other inert solvents. The reaction mixture is preferably heated to a temperature of 25° to 75° C before the addition of the alcohol reactant. The alcohol reactant is then added to the hydrogen polysiloxane solvent mixture at an addition rate so as to maintain the reaction temperature indicated above. The reaction is allowed to proceed to completion in 4 to 15 hours and preferably in 5 to 8 hours. After the reaction period is over, a sample of the reaction mixture may be checked by infrared analysis for SiH bonds to determine how far the reaction has proceeded to completion. When at least 98% of the SiH organopolysiloxane has been converted to the reaction product, reaction mixture may be cooled and the reaction may be considered to have proceeded to a sufficient extent for the conversion of the hydrogen polysiloxane to the desired silicone polymeric fluid. The difficulty in this alternative process is in preparing an organohydrogenpolysiloxane within the average unit formula given above, that is, an organohydrogenpolysiloxane of the proper molecular weight, thus one having 2 to 2000 silicon atoms in the polymer chain.

The polymeric and molecular configuration of the hydrogenpolysiloxane of Formula (1) will in fact determine the structure and molecular configuration of the silicone hydraulic fluid produced from the organohydrogenpolysiloxane since in the platinum catalyzed reaction there is simply substituted a hydrocarbonoxy moiety for each hydrogen atom.

Preparation of the organohydrogenpolysiloxane of Formula (1) which can contain both saturated and olefinically unsaturated hydrocarbon groups may be carried out by any of the procedures well known to those skilled in the art. Such polysiloxanes can be produced by following the procedure involving the hydrolysis of one or more hydrocarbon-substituted chlorosilanes in which the substituents consist of saturated hydrocarbon groups. An excess of water is used in such a hydrolysis so as to obtain a crude hydrolyzate containing a mixture of linear and cyclic polysiloxanes. To the hydrolyzate there is added a catalyst, preferably a basic or acid catalyst such as potassium hydroxide, sodium hydroxide, toluene, sulfonic acid, etc. and the hydrolyzate mixture is heated to a temperature of about 150° C to produce and recover by evaporation a product consisting C low molecular weight cyclic polysiloxanes. When the crude hydrolyzate mixture is treated with potassium hydroxide and heated to a temperature of at least 100° C, the hydrolyzate is converted to a mixture of low boiling, low molecular weight cyclic polymers mixed with undersirable materials such as monofunctional and trifunctional chlorosilane starting material. The chlorosilanes that may be used are the ones indicated in the prior hydrolysis process with the exception that the silane $SiX_4$ is not used.

By heating the resulting mixture of cyclics to a temperature of 150° C, there is able to be collected a pure product of the low boiling, low molecular weight cyclic polymers free of any significant amount of monofunctional and trifunctional groups. If the hydrolysis and subsequent polymerization is carried out properly, there is obtained cyclic polysiloxanes comprising, for example, about 85% of the tetrasiloxane and 15% of the mixed trisiloxane and pentasiloxane. The overhead cyclic siloxanes contain substantially very little water and it is preferably that such cyclic siloxanes have less than 100 parts per million of water. In the same way, there can be obtained alkyl hydrogen cyclic siloxanes and other types of hydrocarbon substituted hydrogen cyclic siloxanes. The cyclic siloxanes are then added in the desired proportion in a reaction vessel so as to be subjected to an equilibration reaction to form the hydrogen polysiloxane of Formula (1). If desired and depending upon the type of compound that is to be produced, 0.1 to 1.0 mole percent of methylvinylcyclicsiloxane may be mixed with the hydrogen methyl and dimethyl cyclicsiloxanes. In the equilibration reaction there may be used as a catalyst, any strong acid. There is preferably used in the present reaction, an acid such as toluene sulfonic acid or sulfuric acid and other types of strong acids which are well known in such polymerization reactions. There is further added to the reaction mixture, the necessary amount of one or more monofunctional compounds calculated to function as endblockers for limiting the degree of polymerization and consequently the lengths and molecular weights of the linear polysiloxane chains for stabilizing the polymer.

In the present case, since it is desired that the final polymer preferably not have more than 2,000 silicon atoms in the molecular chain and that the average polymer chain have about 20–40 silicon atoms, a sufficient amount of the monofunctional endblocker units must be added so as to properly limit the chain length of the resulting hydrogenpolysiloxane polymer. The functional compounds that may be employed satisfactorily for controlling polymer growth include, among others, hexamethyldisiloxane, tetramethyldiethoxydisiloxane, dihydrogentetraethoxydisiloxane, divinyltetraethoxydisiloxane and deca-methyltetrasiloxane. The equilibration reaction is carried out from 2 to 4 hours until about 85% of the cyclic diorganosiloxanes have been converted to polymer end-stopped with monofunctional groups. When the 85% conversion point has been reached, there are just as many polymers being converted to cyclic siloxanes as there are cyclic siloxanes being converted to the polymers. At that time the reaction mixture is cooled and there is added to the reaction mixture a neutralizing agent such as a bicarbonal so as to neutralize the acid catalyst that is present in there. The cyclic diorganosiloxanes in the reaction mixture may then be distilled off to leave the hydrogenpolysiloxane which is useful in the present invention. The above procedure can be used to produce branch chain hydrogenpolysiloxane as well as linear diorganopolysiloxanes depending on the reactants that are used in the equilibration reaction.

An illustrative reaction to produce the hydrogenpolysiloxane within the scope of Formula (1) is to equilibrate octamethyltetrasiloxane and tetramethyltetrahydrogentetrasiloxane in the proper molar proportion in the presence of 3% of acid-treated clay, such as 3% Fuller's earth and then the reaction mixture is heated for 5 hours at 100° to 120° C to equilibrate the reaction mixture. There is also added to the reaction mixture, the proper amount of hydrogentetramethyldisiloxane. After 5 hours of reaction time when approximately 85% of the tetramers have been converted to the polymer polysiloxane, the catalyst is neutralized with a weak base and the volatile cyclics are distilled off to leave a substantially pure hydrogenpolysiloxane. The hydrogenpolysiloxane of Formula (1) may then be reacted with one of the alcohols mentioned previously in accordance with the platinum catalyzed reaction discussed above to produce the novel silicone hydraulic fluid polymers of the present invention having the formula, $$R_a(MO)_b SiO_{(4-a-b)/2} \qquad (2)$$

where R, M, a and b and the sum of a and b is as previously defined in the specification, that is, various from 0.1 to 2.5, b varies from 0.1 to 2.5 and the sum of a + b varies from 2.01 to 3.0. Within this average unit formula there is obtained a fluid silicone polymer within the present invention which contains

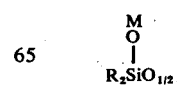

units, $R_2SiO$ units,

units and

units and $RSiO_{3/2}$ units and $R_3SiO$ units with the mole percent limits specified for the hydraulic fluids of the present case.

A silicone fluid polymer can be prepared by the use of this alternate procedure, that is, the use of the hydrogenorganopolysiloxane, such that the fluid contains the units mentioned above which units are present at a concentration within the broad range of mole percents indicated previously in the general definition of the fluids of the present case. Thus, by this alternative method, that is, through the use of an organohydrogenpolysiloxane, there may be obtained a compound within the scope of Formula (2) which has the preferred combination and concentration of

units and $R_2SiO$ units,

units,

units and $RSiO_{3/2}$ units with some amounts of $R_3SiO$ units. Preferably, the second procedure is used when the average polymer chain desired in the final silicone hydraulic fluid of the present invention is to have 50 to 1,000 silicon atoms.

In addition, it is preferred to use the hydrolysis procedure of the organohalosilanes which was first discussed in this specification in preparing the novel silicon fluid of the present invention in that it is a less expensive procedure than the procedure utilizing the hydrogenpolysiloxane. For silicone polymers within the present invention which are to have an average chain length of 2 to 40 silicon atoms, the first procedure is much preferred over the second alternative procedure.

In the case where the M substituent in the silicone fluid polymer of the present invention represents lower alkyl group and particularly methyl, it may be possible to prepare a silicone fluid within the scope of the present invention by forming methoxymethylcyclicsiloxanes in accordance with the procedure indicated for forming the organohydrogencyclicsiloxanes above and then equilibrating the methoxymethylcyclicsiloxanes to obtain a polymer in accordance with the discussion above. The procedure for equilibrating such cyclic, alkoxy and particularly methoxyalkylcyclicsiloxanes would be the same as that indicated for the production of the hydrogenorganopolysiloxane. Thus, after the equilibration reaction is over the final polymer would be formed and it would not be necessary to carry out further steps to produce the desired alkoxy-substituted silicone polymer of the present invention. However, the difficulty with this alternative procedure which is even less preferable than the procedure utilizing the hydrogenorganosiloxane, is that it is very difficult to obtain alkoxyalkylcyclicsiloxanes and it is also difficult to equilibrate such cyclicsiloxanes without the use of special procedures. In addition, the equilibration reaction will proceed only with poor efficiency if the alkoxy-substitutent group on the cyclicsiloxane is of high molecular weight. Accordingly, the first process outlined in the specification is the preferred process for producing the silicone hydraulic fluid of the present invention.

The novel silicone fluid of the present invention and particularly when it is used as a hydraulic fluid or a brake fluid has many inherent properties such that it does not require the addition of any additives. However, to enhance its properties there may be added various additives in varying quantities. First, there may be added to the hydraulic fluid of the present invention at a concentration of 1 to 10% by weight of said fluid a buffer compound having the formula,

where $R^2$ is selected from the class of hydrogen, monovalent hydrocarbon radicals, halogenated monovalent hydrocarbon radicals and cyanoalkyl radicals, $R^3$ is selected from divalent hydrocarbon radicals, halogenated divalent hydrocarbon radicals of 2 to 10 carbon atoms. Preferably, $R^2$ is either hydrogen or a lower alkyl radical such as, methyl, ethyl, phenyl, etc. The radical $R^3$ is preferably an arylene or alkylene radical of 2 to 10 carbon atoms such as, methylene, propylene, phenylene, etc. Although the hydraulic fluid of the present invention may be used as a brake fluid without the above buffer compound as an additive, the above buffer compound may be added to cause the hydraulic fluid to be slightly basic. It is desirable that the hydraulic fluid of the present case be slightly basic such that it absorbs free water at a faster rate. To the alternative at a concentration of 1 to 10% by weight of the fluid there can be added an anhydride of a carboxylic acid which will also permit the silicone fluid of the present invention to absorb water easily.

In addition to the above compounds there may be added various antioxidants. An antioxidant compound additive to the hydraulic fluid of the present invention is not necessary but it may be added in a concentration of 1 to 5% by weight of the fluid so as to enhance the antioxidant properties of the fluid of the present invention. Thus, in the fluid of the present invention there may be antioxidant compounds selected from the class consisting of

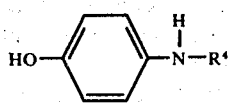

and

where $R^5$ is selected from the class consisting of hydrogen and monovalent hydrocarbon radicals and halogenated monovalent hydrocarbon radicals and is preferably hydrogen or lower alkyl radicals such as, methyl, ethyl and etc., and $R^4$ is selected from the class consisting of monovalent hydrocarbon radicals and halogenated monovalent hydrocarbon radicals and preferably is lower alkyl such as, methyl, ethyl, isopropyl and etc. As pointed out, although these additives may be added to the hydraulic fluid of the present invention particularly when it is going to be used as a brake fluid, to enhance the antioxidant and buffer properties of the hydraulic fluid these additives are not necessary. The hydraulic fluid of the present invention has by itself the proper Ph value and in addition has very good corrosion and antioxidant properties. Furthermore, a brake fluid within the scope of the present invention has a viscosity of 100 to 150 centistokes at −40° C which makes it quite desirable for use as a hydraulic fluid and a brake fluid in the artic regions.

The hydraulic fluid of the present invention may tolerate 6% by weight of water and in fact may tolerate as much as 100% by weight of water or more in some instances. The only undesirable effect of the addition of water above the 6% level, that is, 6% by weight of the silicone fluid of the present invention, is that this additional water may undesirably affect the boiling point of the resulting water-silicone fluid mixture. However, even at the high level concentration of 100% by weight of water in the silicone fluid of the present invention, the water will not separate out from the silicone fluid. In short, the silicone fluid of the present invention meets the highest requirements and specifications for hydraulic fluids.

The examples below are given for the purpose of illustrating the present invention and not intended to limit the scope of the claims or of the invention defined here above in any way or manner.

EXAMPLE 1

There is added to a reaction flask 47.0 parts of $(CH_3)_2SiCl_2$ and 7.3 parts of $CH_3SiCl_3$. To this mixture of methylchlorosilanes there is then added slowly with agitation 5.12 parts of water so as to hydrolyze 65 mole percent of the chlorine atoms present in the organohalosilanes. During such addition of the water the reaction mixture is not heated and as a result of the hydrogen chloride vapors being given off in the hydrolysis, the reaction temperature is maintained at about 4° C. The addition of the water takes place in approximately 1½ hours. After all the water has been added, the hydrolyzate is heated to 30° C at which point the hydrolysis is essentially complete. To the resulting hydrolyzate there is added 30 parts of toluene and the hydrolyzate is dissolved in the toluene with some agitation. After 15 minutes of stirring the hydrolyzate into the toluene solution, the solution is heated to 50° C and there is added to it at this temperature 46.6 parts of 2-methoxy-2-ethoxy ethanol. The resulting ingredients are stirred for 2 hours and the mixture is heated to a temperature of 50° C. At the end of that time, the resulting solution is heated to 158° C and maintained at that temperature for 2 hours until all of the toluene, excess alcohol and cyclic siloxanes have been stripped off. At the end of that point, the solution is brought up to 185° C for about 5 minutes to remove some of the disiloxanes that have been formed which are deleterious to the desirable properties of the fluid of the present invention.

The resulting fluid has a viscosity of 7 centistokes at 25° C and there is present in said fluid 48 weight percent of 2-methoxy-2-ethoxy ethylene groups based on the weight of the fluid. The infrared analysis disclosed that the fluid contains the proper proportion of 2-methoxy-2-ethoxy ethylene groups in the silicone polymer fluid and that the fluid contains

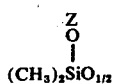

units, $(CH_3)_2SiO$ units,

units,

units and $CH_3SiO_{3/2}$ units, where Z is 2-methoxy-2-ethoxyethylene.

EXAMPLE 2

Into a reaction chamber there is placed 46.0 parts of $(CH_3)_2SiCl_2$, 8.0 parts of $CH_3SiCl_3$, and 0.2 parts of $(CH_3)_3SiCl$. The resulting mixture of organohalosilanes and halosilanes are mixed for 5 minutes and there is added to them 5.12 parts of water which is sufficient water to replace 70 mole percent of the chlorine atoms present on the silanes. The water is added slowly to the organohalosilanes over a period of 30 minutes and the resulting evolution of hydrogen chloride gases maintains the reaction temperature at 9° C. After the addition of water has been completed, the mixture is agitated for 5 minutes and then it is heated to a temperature of 30° C at which point there is added to the mixture 30 parts of xylene to dissolve the hydrolyzate. After the hydrolyzate has been dissolved in the xylene, the resulting solution is raised to 55° C and there is added to the solution 46.6 parts of $C_4H_9(OC_2H_4)_{15}OH$. This polyether is added to the solution of the hydrolyzate slowly with agitation over a period of 1 hour and the reaction during that time is maintained at 55° C. After all the polyether has been added the solution is continually agitated for another 30 minutes and heated at 55° C. Then the temperature of the solution is raised to 153° C and maintained at that temperature for a period of 2 hours so as to strip off all of the xylene, cyclicsiloxanes and excess alcohol from the solution. After that time, then the remaining silicone fluid of the present case is heated at 185° C for about 5 minutes to remove a portion of disiloxanes that were formed. The residue that remains is the novel silicone fluid of the present invention. Infrared analysis indicates that this silicone fluid contains 42% by weight of the fluid of polyether groups. The viscosity of this silicone fluid at 25° C is 25 centistokes and it contains

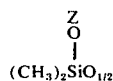

units, $(CH_3)_2SiO$ units,

units,

units, $(CH_3)SiO_{3/2}$ units, $(ZO)_3SiO_{1/2}$ units, $(ZO)_2SiO$ units, $ZOSiO_{3/2}$ units, $SiO_2$ units and $(CH_3)SiO_{1/2}$ units, where Z is $C_4H_9(OC_2H_4)_{15}$.

The silicone fluid prepared in accordance with Example 1 is tested in various brake fluid tests as to determine its suitability or superiority as a brake fluid in terms of its evaluation in these tests.

One test that may be used is a dry equilibrium reflux boiling test which is carried out by placing 60 millimeters of the hydraulic fluid in a flask and boiling under specified equilibrium conditions in a 100 millimeter flask. The average temperature of the boiling fluid at the end of the reflux period is determined and corrected for variations of barometric pressure where necessary and the final value is its equilibrium reflux boiling point. The hydraulic fluid of Example 1 when tested for its equilibrium reflux boiling point has a value of greater than 500° F.

A wet equilibrium reflux boiling test was carried out in the present invention wherein the hydraulic fluid of Example 1 was taken and there was added 10% water by weight to it, and 0.1% three normal hydrochloric acid. Infrared spectra showed the appearance of a large OH bond, no water band and a slight increase in polymer length and a silanol element. When tested for its wet equilibrium boiling point it was found that the fluid of Example 1 with this large amount of water in it had a wet equilibrium boiling point of 150° C. A typical glycol fluid with this much amount of water in it had a wet equilibrium boiling point of 105° C, thus, indicating the superiority of the silicone fluid of the present invention in maintaining its high boiling point and being compatible with a large amount of water while still maintaining a high temperature stability and a high boiling point. The water is prevented from being boiled out of the silicone fluid and thus forming a vapor lock in hydraulic lines as is possible with a glycol based fluid.

A wet equlibrium reflux boiling point determination was obtained by first humidifying 10 mole of the fluid of Example 1 for three days at 80% relative humidity along with 100 millimeters of SAE compatible fluid wherein at the end of the three days the compatibility fluid had absorbed 3% by weight water and the fluid of Example 1 absorbed 0.3% by weight of water. The humidified fluid of Example 1 when tested for its wet equilibrium reflux point in the same way as for the determination of the dry equilibrium reflux boiling point had a wet equilibrium reflux boiling point of greater than 320° F.

For the flash point determination, the test is to take a test dish which is filled to a specified level with the hydraulic fluid of the present case. The fluid temperature is increased rapidly and then at a slower rate as the flash point is approached. At specified intervals, a small test flame is passed across the cup. The lowest temperature at which application of the test flame causes the vapors above the fluid surface to ignite is the flash point. The hydraulic fluid of Example 1 has a flash point of at least 350° F.

The kinematic viscosity test is a determination of the measure of the time necessary for a mixed volume of the hydraulic fluid to flow through a calibrated glass capillary viscometer under an accurately reproducable head and a closely controlled temperature. The kinematic viscosity is then calculated from the measure of flow time in the calibration constant viscometer. At −40° C the hydraulic fluid of Example 1 had a viscosity of 100 centistokes and at 212° F the hydraulic fluid of Example 1 had a viscosity of 1.8 centistokes.

In the pH value determination a quantity of the hydraulic fluid is diluted in an equal volume of methanol water solution. The pH of the resulting solution is measured with a prescribed pH meter assembly at 23° C. Without the buffer compound additive disclosed in the present specification, the hydraulic fluid of Example 1 has a pH of 6.8. With 1% by weight of the hydraulic fluid of Example 1 of a buffer compound having the formula

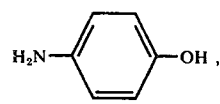

the resulting hydraulic fluid has a pH of 8.1. The brake fluid stability comprises a high temperature stability and a chemical stability test. In the case of the high temperature stability test, a 60 millimeter sample of the brake fluid is heated to an appropriate holding temperature and then the brake fluid is maintained at a holding temperature for 120 ± 5 minutes. Then for the next 5 ± 2 minutes the fluid is heated to an equilibrium reflux rate of 1 to 2 drops and the temperature is taken. The hydraulic fluid of Example 1 was able to be maintained at that reflux rate without any drop in temperature.

In the case of a chemical stability test, 30 ± 1 millimeters of the hydraulic fluid is mixed with 30 ± 1 millimeters of SAE-1 compatibility fluid in the boiling flask. First, the initial equilibrium reflux boiling point of the mixture is determined by applying heat to the flask so that the fluid is refluxed for 10 ± 2 minutes at a rate in excess of one drop per second. Then over the next 15 ± 1 minutes the reflux rate is adjusted and maintained to one to two drops per second. This rate is maintained for an additional two minutes and the average value is recorded as the final equilibrium reflux boiling point. The change in the reflux boiling point during the test is measured. In this case there was no change in the reflux boiling point during the test.

The hydraulic fluid of Example 1 when tested according to these tests suffered a negligible drop in temperature.

The corrosion test comprises polishing, cleaning and weighing 6 specified metal corrosion test strips and assemblying them as prescribed in the standards. This assembly is placed on a standard rubber wheel cylinder cup in the corrosion jar and immersed in the brake fluid, capped and placed in an oven at 100° C for 120 hours. Upon removing and cooling the jar, the strips in the fluid cup are examined and tested. The metal test strips are observed to note whether there are any crystalline deposits which form and adhere to the glass jar walls or the surface of the metal strips and whether there is sedimentation in the fluid water mixture. The metal strips are weighted for weight loss and other determinations are made with respect to them. Thus, in the results of this test in terms of the metal weight loss, the steel strip suffered a loss of 0.15 milligrams/cm$^2$, the aluminum strip suffered a loss of 0.1 milligrams/cm$^2$, the brass strip suffered a loss of 0.2 milligrams/cm$^2$, the copper strip suffered a loss of 0.2 milligrams/cm$^2$, the iron strip suffered no loss, and the plated steel strip suffered no loss. There was no gelling of the fluid at the high temperature and no gelling of the fluid at the low temperature of 23 ± 5° C. There were no deposits in the fluid and the sediment that was weighted was less than 0.1 weight percent of the fluid. The pH of the fluid after the test was between 7 to 11.

The next test is the effect on rubber where four selected styrene butadiene rubber cups are measured and their hardness determined. This test is known as the Rubber Swell Test J-1703. In this test the cups are placed two to a jar and are immersed in the hydraulic fluid of Example 1. One jar is heated for 120 hours at 70° C and the other for 70 hours at 120° C. After this, the cups are removed, washed and examined for disintegration. They are remeasured and their hardness redetermined. In this test the cups after being immersed in the hydraulic fluid of the present invention in accordance with the above test had a hardness of 15 when measured at the end of the test. In addition, the swell was measured to be 1.2 millimeters. This test was also run with the Neoprene rubber cups and the swell was found to be with Neoprene rubber cups to be 4% by volume. In addition, the test was carried out with ethylene-propylene rubber cups where the swell was found to be 2%. In these other latter tests the rubber after the test is tested and found to have a hardness of 15 and 16, respectively. All these values for swell are sufficient to pass the requirements for brake fluids.

In the fluid appearance at low temperature test the test comprises taking the hydraulic fluid of Example 1 and lowering it to expected minimum exposure temperatures such as −40° C and then the fluid is then observed for clarity, gellation, sedimentation, excessive viscosity of thixotropy. The hydraulic fluid of Example 1 with 3.5% of water in it has no crystallization, cloudiness sedimentation when taken to this low temperature −40° C, and further upon reversion of the sample bottle in which the test is carried out, the time required for the air bubble to travel to the top of the fluid is less than 10 seconds.

In the water tolerance test the hydraulic fluid is diluted with sufficient water so that there is 3.5% by water in the fluid and it is stored at low temperatures of −40° to −50° C for 24 hours. The cold water wet fluid is first examined for clarity, stratification, sedimentation and placed in an oven at 60° C for 24 hours. Then it is removed and again examined for stratification and sedimentation. The hydraulic fluid of Example 1 when subjected to this test, that is, after it is kept at −40° to −50° C for 24 hours, was clear and there was no stratification or sedimentation. Further, even after being placed in an oven at 60° C for 24 hours, there is again no stratification and no sedimentation.

The other important test is the compatibility test in which a sample of the hydraulic fluid of Example 1 is mixed with an equal volume of SAE compatibility fluid, then tested in the same way as the last mentioned test which is the water tolerance test. When the hydraulic fluid of Example 1 was mixed with equal volume of SAE compatibility fluid which is a glycol based brake fluid and as observed after the necessary time at the low temperature −40° to 50° C, and also after the necessary time, that is, 24 hours at 60° C, the fluid is found not to have stratified and not to have any sedimentation, and also to be perfectly clear in both cases.

The hydraulic fluid of Example 1 was also tested in several other tests which will not be mentioned here in detail such as, the resistance to oxidation test, the stroking properties test, the evaporation test which tests are usually specified for brake fluids and it is found that the hydraulic brake fluid of Example 1 performs in a superior manner in these tests, as compared to the glycol based polyether fluids. The tests that have been discussed in detail above are the particular tests for brake fluids which show the advantages and superior properties of the hydraulic fluid of Example 1 and more generally the hydraulic fluid of the present invention as a brake fluid.

The above examples were given for the purpose of illustrating the advantages of the hydraulic fluid mixtures of the present invention over conventional hydraulic fluids and more particularly over conventional brake fluids. It is not intended in any way or manner by these examples to limit the application of the hydraulic silicone fluid mixtures defined in this application solely for use as a brake fluid in an automotive system or as a brake fluid in any other type of vehicle system. Generally, as has been stated previously, the hydraulic silicone fluid mixture as defined in the present specification, may be used in any type of hydraulic system including any type of hydraulic brake system of any type of vehicle.

I claim:

1. A process for producing a novel silicone fluid polymer useful as a hydraulic fluid consisting essentially of (a) adding up to 3.5 moles of water per mole of a mixture of silanes having therein 75 to 95 mole percent of $R_2SiX_2$, 5 to 25 mole percent of $RSiX_3$, and trace amounts of silanes selected from the class consisting of $SiX_4$ and $R_3SiX$ where there is added sufficient water to replace 50 to 85 mole percent of the X atoms present in the silanes, X is selected from halogen, R is selected from the class consisting of monovalent hydrocarbon radicals, halogenated monovalent hydrocarbon radicals and cyanoalkyl radicals and which reaction is carried out at a temperature of 9° to 20° C; (b) adding with agitation to the hydrolyzate up to 30 parts of a water-immiscible organic solvent to form a solution; (c) heating the resulting solution to 25°– 100° C; (d) agitating into the solution 0.15 to 3.0 moles of an alcohol selected from the class consisting of ROH, ROR′OH, and ROR′OR′OH, and $R(OC_xH_{2x})_n$—OH, where R is as previously defined, R′ is selected from divalent hydrocarbon radicals and halogenated divalent hydrocarbon radicals, $x$ varies from 2 to 4 and $n$ varies from 4 to 100; (e) heating and resulting mixture to the reflux temperature of the solvent to strip off all solvent, cyclic siloxanes and free alcohol; and (f) cooling the resulting silicone polymer fluid to room temperature.

2. The process of claim 1 wherein the water-immiscible organic solvent is selected from the class consisting of xylene and toluene.

3. The process of claim 1 wherein the heating in step (e) is in the temperature range of 100° C to 185° C.

4. The process of claim 1 wherein the final silicone polymer fluid has a viscosity in the range of 2 to 4 centistokes at 25° C.

* * * * *